(12) United States Patent
Hardie

(10) Patent No.: US 10,111,082 B1
(45) Date of Patent: *Oct. 23, 2018

(54) RELATING TIME-TO-LIVE INFORMATION WITH LOCATION DATA

(71) Applicant: Google Inc., Mountain View, CA (US)

(72) Inventor: Edward Thomas Lingham Hardie, Redwood City, CA (US)

(73) Assignee: Google LLC, Mountain View, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/671,644

(22) Filed: Mar. 27, 2015

Related U.S. Application Data

(63) Continuation of application No. 13/527,058, filed on Jun. 19, 2012, now Pat. No. 8,996,052.

(51) Int. Cl.
*H04W 64/00* (2009.01)
*H04W 8/02* (2009.01)
*H04L 12/841* (2013.01)

(52) U.S. Cl.
CPC ............. *H04W 8/02* (2013.01); *H04L 47/286* (2013.01)

(58) Field of Classification Search
CPC ... H04W 64/003; H04W 88/08; H04W 64/00; H04W 84/005
See application file for complete search history.

(56) References Cited

U.S. PATENT DOCUMENTS

| | | | |
|---|---|---|---|
| 7,907,562 B2 | 3/2011 | Murty et al. | |
| 8,180,368 B2 | 5/2012 | Anderson et al. | |
| 8,326,324 B2 | 12/2012 | Wu et al. | |
| 2007/0121557 A1* | 5/2007 | Sylvain | G01S 1/68 370/338 |
| 2008/0148360 A1* | 6/2008 | Karstens | H04L 63/10 726/4 |
| 2011/0250903 A1 | 10/2011 | Huang et al. | |
| 2011/0287764 A1* | 11/2011 | Zitnik | H04W 8/10 455/433 |
| 2011/0317660 A1* | 12/2011 | Jin | H04W 36/14 370/331 |
| 2013/0109409 A1 | 5/2013 | Ortiz | |

OTHER PUBLICATIONS

U.S. Notice of Allowance in U.S. Appl. No. 13/527,058 dated Nov. 24, 2014.
U.S. Office Action in U.S. Appl. No. 13/527,058 dated Aug. 8, 2014.

* cited by examiner

*Primary Examiner* — Anez Ebrahim
(74) *Attorney, Agent, or Firm* — McDermott Will & Emery LLP

(57) ABSTRACT

This disclosure relates to relating time-to-live information with location data for wireless network access points. A freshness component determines a value associated with a freshness of location data for an access point. An encoding component encodes the value into a time-to-live information element included publicly broadcast access point information, and a transmitter transmits the publicly broadcast access point information. The publicly broadcast access point information includes at least one of a beacon frame or probe response. Additionally, by providing a value satisfying a non-inclusion threshold for the time-to-live information, emitters or network administrations may use time-to-live information to indicate that they do not wish to have location data for an access point stored.

20 Claims, 10 Drawing Sheets

RELATING TIME-TO-LIVE INFORMATION WITH LOCATION DATA

CROSS-REFERENCE TO RELATED PATENT APPLICATIONS

This application is a continuation application claiming priority to U.S. patent application Ser. No. 13/527,058, filed Jun. 19, 2012, issuing as U.S. Pat. No. 8,996,052, on Mar. 31, 2015, the entirety of which is incorporated herein by reference.

TECHNICAL FIELD

This disclosure generally relates to systems and methods that facilitate relating time-to-live information with location data for wireless network access points.

BACKGROUND

Expanding availability of internet connectivity and mobile devices are continually reshaping the way users interact with information. Modern technology enables users around the world to connect and share information in real-time using devices that fit conveniently into a pocket or purse. Due in part to the mobility of current devices, location-based services are among the most popular features in use today. Location-based services enable users to identify a current location or nearby locations of interest. In addition, users enjoy being able to incorporate location information into status updates and other social networking activities.

A common technique for determining the location of a mobile device includes using a location database. The location database matches publicly broadcast information about local wireless networks with their approximate geographic location. An approximate location of a device can be determined based on a proximity of the device to known wireless access points included in a location database. Location databases are relatively fast and efficient for determining the location of a device, and can be a useful alternative to other approaches. Additionally, location database based techniques can be used indoors where other techniques, such as global positioning systems (GPS), may not.

Location-based services provide enhanced user experiences with greater personal relevance to users. However, if the location data is incorrect, then persistently bad data can be returned based on the incorrect location. For instance, if the location of a wireless access point changes, and the location of the device is determined based on its proximity to the wireless access point, then the device may be determined to be in an incorrect location. Nomadic wireless access points, such as those providing service to transport vehicles, conventions, or meetings are particularly susceptible to being used as sources for incorrect location determination.

SUMMARY

The following presents a simplified summary of the specification in order to provide a basic understanding of some aspects of the specification. This summary is not an extensive overview of the specification. It is intended to neither identify key or critical elements of the specification nor delineate any scope of particular embodiments of the specification, or any scope of the claims. Its sole purpose is to present some concepts of the specification in a simplified form as a prelude to the more detailed description that is presented later.

According to an aspect of the subject innovation, systems and methods for relating time-to-live information with location data are disclosed. A freshness component determines a value associated with a freshness of location information for an access point. An encoding component encodes the value into a time-to-live information element included in publicly broadcast access point information, and a transmitter transmits the publicly broadcast access point information. The publicly broadcast access point information includes at least one of a beacon frame or probe response. Additionally, by providing a value of, for example, zero for the time-to-live information, emitters or network administrations may also use time-to-live information to indicate that they do not wish to have location data for an access point stored.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Overview

Figure 1:
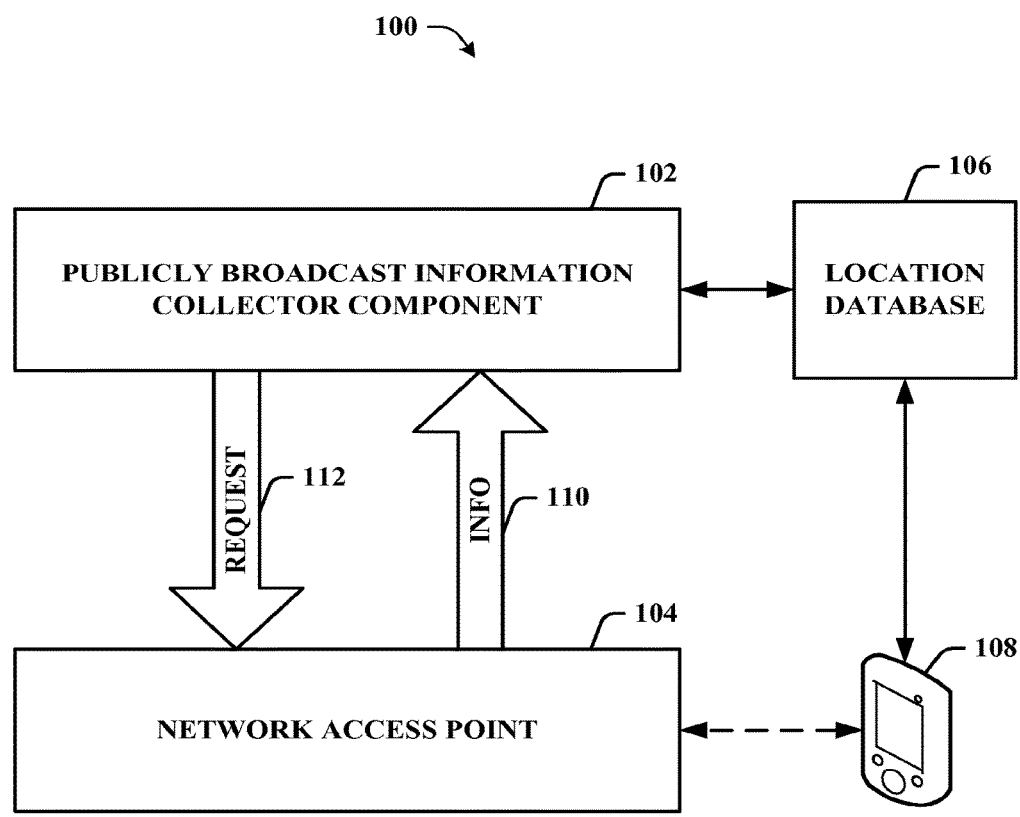
FIG. 1 illustrates an example system for relating time-to-live information with location data for access points in accordance with various aspects described in this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

As noted in the Background section, techniques that determine a location of a device based proximity of the device to an access point can return persistently bad data or results, if the location data associated with the access point is not fresh. Nomadic wireless access points, such as those providing service to transport vehicles, conventions, or meetings may often provide ephemeral location data that is fresh or accurate for a limited period of time.

In one non-limiting implementation of this disclosure, an efficient and accurate technique for determining ephemeral location data associated with an access point is provided. The implementation relates time-to-live information with location data for wireless network access points. The time-to-live information also provides a convenient option for emitters or network administrators to indicate that they do not wish to have location data for an access point stored. For example, by providing a value satisfying a non-inclusion threshold (e.g., zero) for the time-to-live information, emitters or network administrations may also use time-to-live information to indicate that they do not wish to have location data for an access point stored.

More particularly, in accordance with an embodiment, a reception component receives publicly broadcast access point information from an access point, an inspection component decodes a time-to-live information element encoded into the publicly broadcast access point information, and determines a freshness value based on the time-to-live information element. An association component determines the freshness value does not satisfy a non-inclusion threshold, and in response to the freshness value not satisfying the non-inclusion threshold, location data for the access point is stored.

Non-Limiting Examples of Systems for Relating Time-to-Live Information with Location Data for Access Points Turning now to FIG. 1, illustrated is an example system 100 for relating time-to-live information with location data for access points in accordance with various aspects described in this disclosure. Generally, system 100 can include a memory that stores computer executable components and a processor that executes computer executable components stored in the memory, examples of which can be found with reference to FIG. 10. System 100 includes a publicly broadcast information collector component 102 (PBIC component 102). The PBIC component 102 receives, acquires, or otherwise collects publicly broadcast information from network access points, e.g., access point 104 (AP 104), and associates location data (or location information) with the network access points. For example, in one embodiment, the PBIC component 102 collects a Media Access Control identifier (MAC ID) for an AP 104, and associates a location with the MAC ID. As an additional or alternative example, in one embodiment, the PBIC component 102 collects a tuple of identifiers for the AP 104, and associates a location with the tuple. The tuple can include but is not limited to a MAC ID and a service set identifier (SSID). Aspects of the innovation are not limited to techniques for determining the location data associated with the AP 104. For example, in one embodiment, the location data can be determined using global positing system (GPS) satellite data. The AP 104 includes but is not limited to dedicated wireless network access points, and/or mobile devices that function as wireless network access points. For example, the AP 104 can include an 802.11 access point (e.g., 802.11a, b, g, n and/or ac), a mobile AP (e.g., a MiFi™, etc.), a smart phone, a cell phone, a personal digital assistant (PDA), a tablet, a laptop, a desktop, a portable music player, a video game system, an electronic reader (e-reader), a global positioning system (GPS), a set-top box, and/or a television.

The publicly broadcast information (e.g., MAC ID) and associated location data for the AP 104 can facilitate location approximations for a mobile device (e.g., device 108). For example, in one embodiment, the PBIC component 102 provides the MAC ID and associated location data for the AP 104 to a location database 106. A device 108 can observe, sense, or otherwise receive a MAC ID for the AP 104, and using location data associated with the AP 104 maintained by the location database 106, the device 108, an application executing on the device, and/or another device associated with the device 108, can determine an approximate location of the device 108 based on the proximity of the device 108 to the AP 104. The device 108 can include but is not limited to a smart phone, a cell phone, a personal digital assistant (PDA), a tablet, a laptop, a desktop, a portable music player, a video game system, an electronic reader (e-reader), a global positioning system (GPS), a set-top box, and/or a television.

The AP 104 can include a stationary or a nomadic AP. For example, the AP 104 can include a stationary AP providing service to an office building, a school, or a business (e.g., coffee shop, etc.). As an alternative example, the AP 104 can include a nomadic AP providing service on a bus, a train, or to a traveling convention. It is to be appreciated, if the location of the device 108 is determined based on the location of a nomadic AP, then the location of the device 108 may be incorrect. For example, if the AP 104 provides service on a bus, then the PBIC component 102 may associate location data for AP 104 at a first location on the bus route with the AP 102. However, the AP 104 may seldom be at, or around, the first location. Consequently, if the location of the device 108 is determined using the location data from the first location, then the location of the device 108 may be determined incorrectly.

The AP 104 reduces incorrect location determinations based on stale location data associated with nomadic access points, and provides enhanced privacy features, by encoding time-to-live information (TTL) into publicly broadcast access point information 110 (PBAP info 110 or info 110). The PBAP info 110 can include but is not limited to a beacon frame or a probe response. The TTL includes a freshness value that indicates, for example, an amount of time (e.g., seconds, minutes, hours, days, etc.) that location data associated with the AP 104 may be accurate (e.g., fresh). For example, a mobile device that occasionally acts as the AP 104 can have TTL including a freshness value satisfying a mobile AP threshold (e.g., 60 to 300 seconds). As an additional or alternative example, a stationary access point that provides service to, for example, an office building, a school, etc. can have TTL including a freshness value satisfying a stationary AP threshold (e.g., a month, a year, etc.). Aspects of the invention are not limited to a format of the freshness value. For example, the freshness value can include encodings in duration (e.g., fresh for 300 seconds from a current time) and/or encodings of terminal stability (e.g., stable until Jun. 20, 2012).

The PBIC component 102 receives the info 110 by listening (e.g., passively) to beacon frames, and/or by issuing a probe request 112, and examining a probe response. The PBIC component 102 decodes an identifier for the AP 104 (e.g., MAC ID) and TTL included in the info 110. The PBIC component 102 maintains the identifier for the AP 104, the TTL, and associated location data for the AP 104 in the location database 106. When, the location database 106 receives a query for the location data associated with the AP 104, e.g., from the device 108, the location database 106 determines based on the TTL if the location data is fresh (e.g., if the TTL has expired). If the location data is fresh, then the location database 106 provides the location data to the device 108. If the location data is not fresh, then the location database 106 does not provide the location data to the device 108, or marks the location data stale (e.g., not fresh) and provides the stale location to the device 108.

As an additional or alternative example, in one embodiment, the freshness value included in the TTL can be set to a value satisfying a non-inclusion threshold (e.g., 0), where a network administrator (e.g., operator, emitter, etc.) does not desire for the AP 104 to be included in the location database 106. For instance, if the TTL is set to zero, then the PBIC component 102 does not associate location data with the AP 104 and/or store the location data and AP identifier in the location database 106. It is to be appreciated that although the PBIC component 102 and location database 106 are illustrated as being stand-alone components, such implementation is not so limited. For example, the PBIC component 102 and/or location database 106 can be integrated and/or included in an internet application, a server, a cloud, and so forth.

Figure 2:
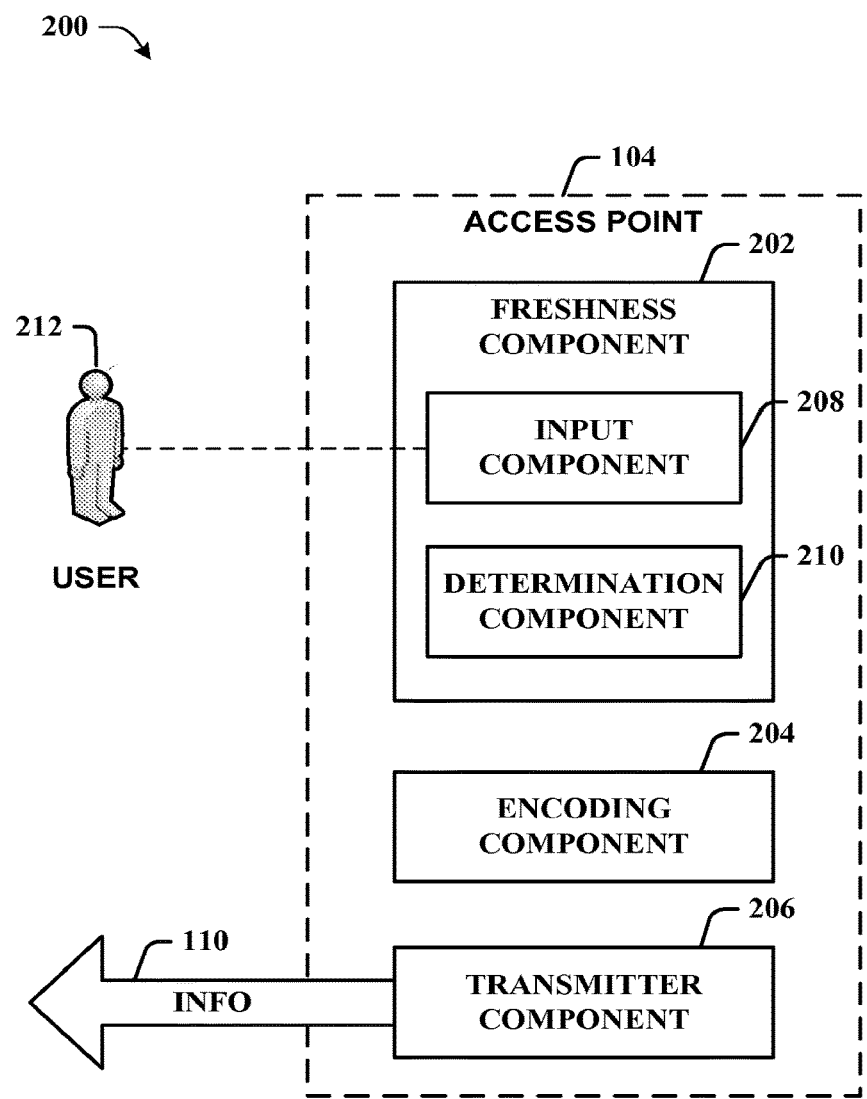
FIG. 2 illustrates an example network access point in accordance with various aspects described in this disclosure.

FIG. 2 illustrates an example network access point 104 in accordance with various aspects described in this disclosure. As discussed, the access point 104 (AP 104) reduces incorrect location determinations based on stale location data associated with nomadic access points, and provides enhanced privacy controls, by encoding time-to-live information into publicly broadcast access point information 110 (e.g., a beacon frame or a probe response). The time-to-live information (TTL) includes a freshness value that indicates a freshness (e.g., stability) for location data associated with the AP 104. The AP 104 in FIG. 2 includes a freshness component 202, an encoding component 204, and a transmitter component 206.

The freshness component 202 determines a freshness value associated with location data for the AP 104. The freshness component 202 includes an input component 208, and a determination component 210. The input component 208 acquires, obtains, or otherwise receives setup data from a user 212 (e.g., network administrator, etc.). The setup data can include explicit user inputs (e.g., configuration selections, question/answer, etc.) such as from mouse selections, keyboard selections, and/or speech. Additionally or alternatively, the setup data can also include data uploads, wherein a data upload is a transfer of data from the user 212 or a third party source (e.g. computer or a computer readable medium), to the input component 208. For example, in one embodiment, the setup data includes but is not limited to a set of operating parameters for the AP 104, a (SSID), a media access control identifier (MAC ID), a set of privacy/security options, a freshness value, and/or a set of network communication options.

The determination component 210 detects, infers, or otherwise determines a freshness value associated with location data for the AP 104. For example, in one embodiment, the user 212 explicitly sets, or provides, the freshness value for the AP 104. For instance, during a setup process the user 212 can explicitly enter a freshness corresponding to a stationary access point. As an additional or alternative example, in one embodiment, the determination component 210 can infer the freshness value based on a set of freshness factors. The freshness factors include but are not limited to a purpose of the AP 104, and/or a security policy associated with the AP 104. For instance, if a security policy associated with the AP 104 indicates that the AP 104 should not be included in a location database (e.g., location database 106), then the determination component can set the freshness to satisfy a non-inclusion threshold. As an additional or alternative example, if the AP 104 is a mobile device that occasionally functions as an access point, then the determination component 210 can set the freshness value to satisfy a mobile AP threshold.

The encoding component 204 includes, incorporates, or otherwise encodes the freshness value into a time-to-live information (TTL) element of publicly broadcast access point information 110 (PBAP info or info 110). The PBAP info 110 includes but is not limited to a beacon frame and/or a probe response having a set of AP data. The AP data includes but is not limited to a header (e.g., media access control header, etc.), a time stamp, a set of capability data (e.g., network structure data), a service set identifier (SSID), a media access control identifier (MAC ID), a set of supported rates data, a frequency-hopping (FH) parameter set, a direct-sequence (DS) parameter set, a contention-free (CF) parameter set, a traffic indication map (TIM), and/or the TTL element.

The transmitter component 206 sends, provides, or otherwise transmits the PBAP info 110. For example, in one embodiment, the transmitter component 206 transmits the PBAP info 110 (e.g., probe response), in response to a probe request from another wireless device (e.g., PBIC component 102). As an additional or alternative example, in one implementation, the transmitter component 206 transmits the info 110 (e.g., beacon frame) based on a set of transmission criteria. The transmission criteria includes but is not limited to a predetermined time interval (e.g., a target beacon transmission time), and/or at predetermined times.

Figure 3:
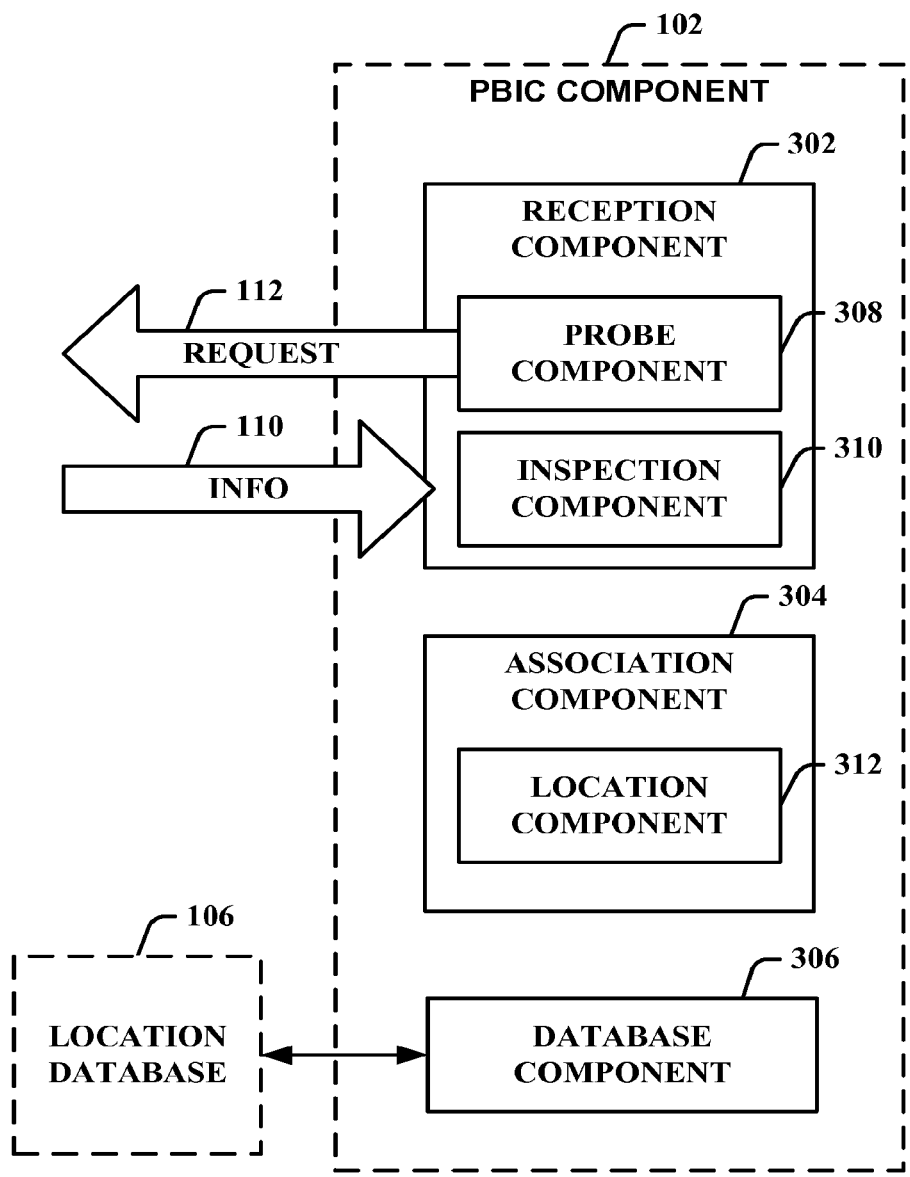
FIG. 3 illustrates an example publicly broadcast information collector component in accordance with various aspects described in this disclosure.

Referring to FIG. 3, illustrated is an example publicly broadcast information collector component (PBIC component 102) in accordance with various aspects described in this disclosure. As discussed, the PBIC component 102 collects publicly broadcast information from network access points, such as an access point 104 (AP 104), and associates location data with the network access points. The PBIC component 102 in FIG. 3 includes a reception component 302, an association component 304, and a database component 306.

The reception component 302 obtains, acquires, or otherwise receives publicly broadcast access point (AP) information 110 (e.g., info 110). The info 110 includes but is not limited to a beacon frame and/or a probe response. For example, in one embodiment, e.g., in FIG. 3, the PBIC component 102 includes a probe component 308. The probe component 308 sends, broadcasts, or otherwise transmits a probe request 112 to one or more access points, and in response to probe request 112, the reception component 302 receives the PBAP info 110 (e.g., a probe response). As an additional or alternative example, in one embodiment, the reception component 302 receives unsolicited PBAP info 110 (e.g., a beacon frame) from an access point.

The reception component 302 includes an inspection component 310 that examines, analyzes, or otherwise inspects the PBAP info 110, and determines time-to-live information (TTL) and an access point (AP) identifier (e.g., MAC ID, SSID, etc.) included in the PBAP info 110. The TTL includes a freshness value that indicates an amount of time location data associated with the AP is likely to be stable, and/or whether an emitter desires to have location data for the AP collected, stored, or otherwise maintained. For example, in one embodiment, the TTL for a mobile device that acts as an AP can include a freshness value that satisfies a mobile AP threshold (e.g., 60 to 300 seconds). As an additional or alternative example, the TTL for a stationary access point that provides service to, for example, an office building can include a freshness value that satisfies a stationary AP threshold (e.g., a month, a year, etc.).

The association component 304 associates location data with the AP identifier if the freshness value does not satisfy a non-inclusion threshold. As discussed, the non-inclusion threshold indicates whether a network operator or emitter desires to have the AP included in a location database 106. If the freshness value does satisfy the non-inclusion threshold, then the association component does not associate location data with the identifier for the AP.

The association component 304 includes a location component 312. The location component 312 ascertains, acquires, or otherwise determines location data (e.g., GPS coordinates, street address, etc.) for the AP (e.g., AP 104). Aspects of the innovation are not limited to techniques for determining the location data. For example, in one embodiment, the location component 312 acquires the location data using GPS satellite data from an AP that includes a GPS receiver. As an additional or alternative example, in one embodiment, the location data is provided by a set of users (e.g., crowd sourced). In one embodiment, the location component 312 notifies users (e.g., user 212) of the types of information that are collected, transmitted, and/or stored, and provides the user the opportunity to opt-out of having such information collected and/or shared with the location component 312.

The database component 306 maintains or stores the AP identifier, the TTL, and associated location data (e.g., determined using the location component 312) in the location database 106, when the TTL value does not satisfy the non-inclusion threshold. If the TTL value does satisfy the non-inclusion threshold, then the database component 306 does not store the AP data, the TTL, and associated location data for the AP in the location database 106.

Figure 4:
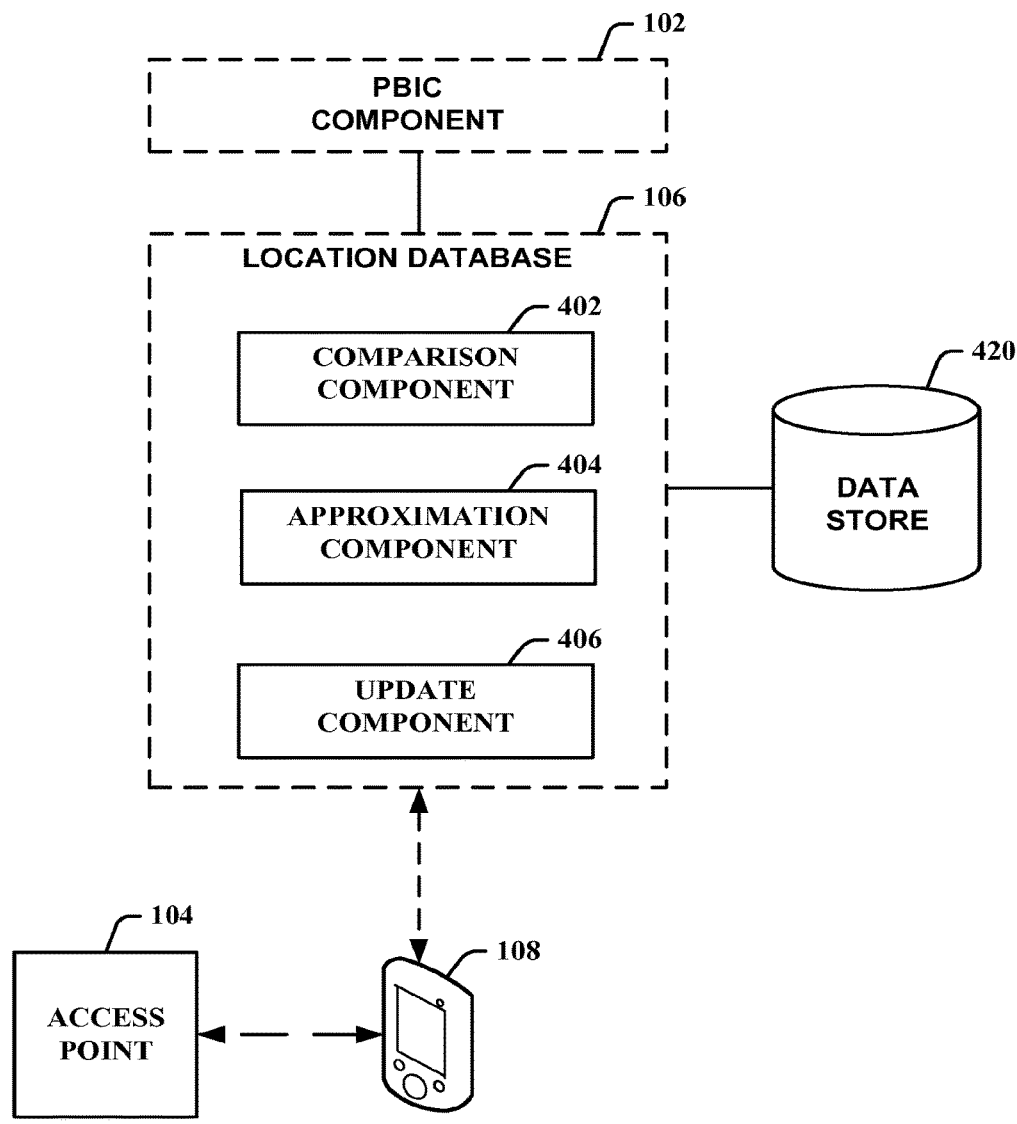
FIG. 4 illustrates an example location database in accordance with various aspects described in this disclosure.

FIG. 4 illustrates an example location database 106 in accordance with various aspects described in this disclosure. As discussed, the location database 106 maintains AP identifiers, TTL, and associated location data. For example, in one embodiment, the location database 106 maintains a first AP identifier (e.g., AP 104), TTL associated with the first AP identifier, and location data associated with the first AP identifier in a data store 420. The AP identifiers, TTL, and associated location data are used to facilitate location approximations for devices based at least in part on proximity of the devices to one or more APs. The location data associated with an AP includes but is not limited to a physical location of the AP (e.g., GPS coordinates, street address, etc.) determined using the PBIC component 102. For example, in one embodiment, the location database receives a query for location data associated with an AP from a querying device (e.g., a device 108), and provides the location data associated with the AP to the querying device based in part on a freshness value included in the TTL for the AP. The location database 106 in FIG. 4 includes a comparison component 402, an approximation component 404, and an update component 406.

In response to the location database 106 receiving a query for location data associated with an AP, the comparison component 402 evaluates, analyzes or otherwise determines whether location data associated with the AP (e.g., AP 104) is fresh based on TTL associated with the AP. For example, in one embodiment, the comparison component 402 determines a time lapse from an origination of a freshness value included in the TTL, and compares the time lapse against the freshness value to determine whether the location data associated with an AP is stale. For instance, an access point providing service to a convention (convention AP) may have a relatively short freshness value (e.g., 120 hours) matching a periodicity of the convention. The comparison component 402 may determine a time lapse greater than the period of the freshness value has occurred (e.g., one year), and that the location data associated with the convention AP is stale.

If the comparison component 402 determines that the location data associated with the AP is fresh or stable, then the location database 106 provides location data associated with the AP to the querying device. As an additional or alternative example, in one embodiment, if the comparison component 402 determines that the location data associated with the AP is fresh or stable, then the approximation component 404 determines an approximate location of a device (e.g., device 108) based at least in part on a proximity (e.g., distance, etc.) of the device to the AP, and the location database 106 provides the approximate location to the device. The approximate location of the device can facilitate providing accurate location-based services to the device.

If the comparison component 402 determines that the location data associated with the AP is not fresh or stable, then the location database 106 does not provide the location data associated with the AP to the device. As an additional or alternative example, in one embodiment, if the comparison component 402 determines that the that the location data associated with the AP is not fresh or stable, then the approximation component provides the location data to the query device along with an annotation that the location data is not fresh. The annotation may include, for example, a single bit marker (e.g., fresh or stale), an amount of time that has passed since the location data was accurate, or a date of terminal validity for the location data. An AP using a TTL value of zero is presumed to be indicating that location data should not be stored, and location data should not be available for queries relevant to those APs.

The update component 406 triggers updating stale location data. For example, in one embodiment, the location database 106 instructs a publicly broadcast information collector (e.g., PBIC component 102) to collect fresh location data for the AP. It is to be appreciated that although the data store 420 is illustrated as being a stand-alone component, such implementation is not so limited. For example, the data store 420 can be included in the location database 106.

Figure 5:
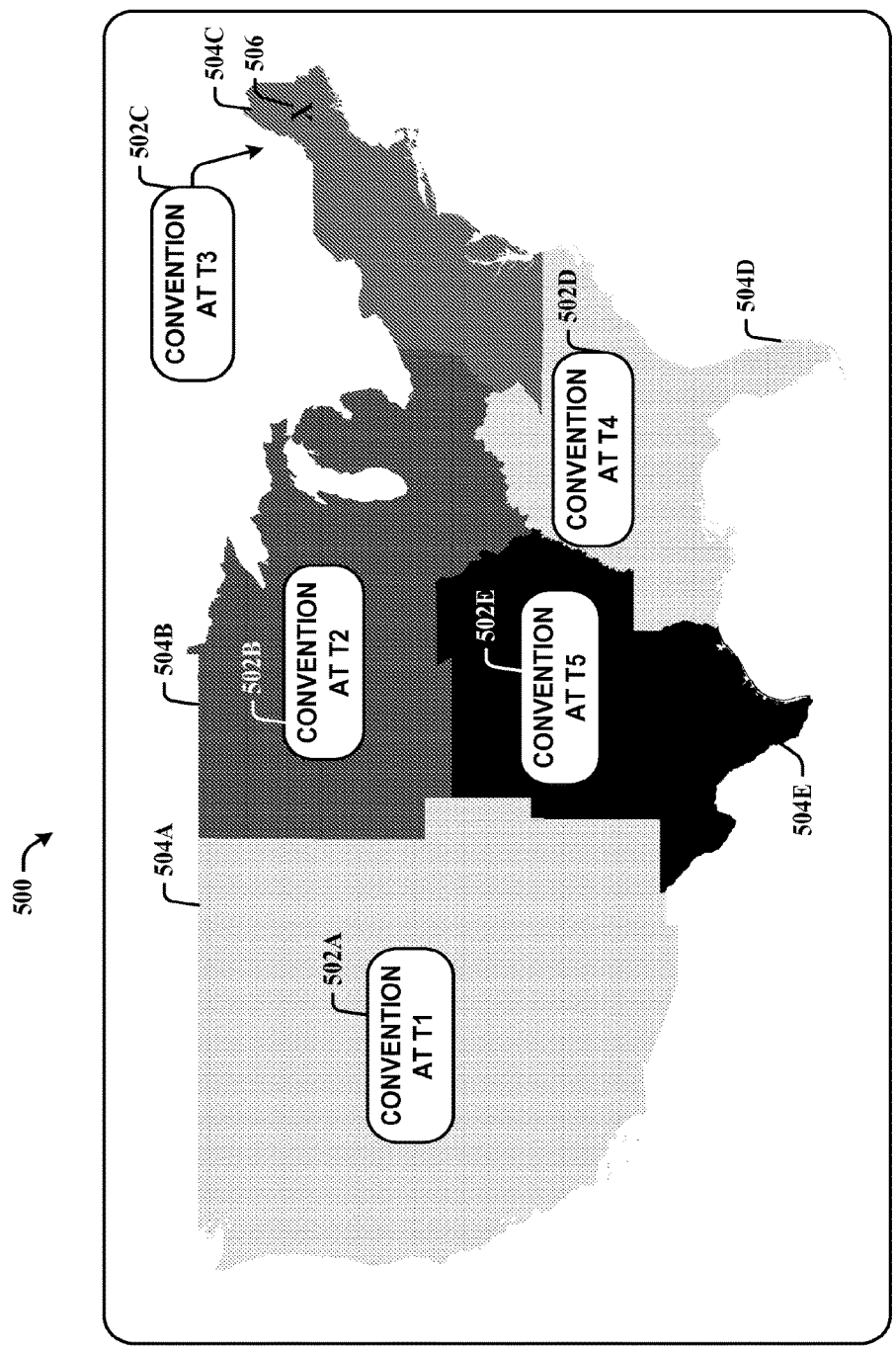
FIG. 5 illustrates a non-limiting example of a nomadic wireless access point in accordance with various aspects described in this disclosure.

Turning now to FIG. 5, illustrated is a non-limiting example of a nomadic wireless access point in accordance with various aspects described in this disclosure. As discussed, access points (APs) can include stationary or nomadic APs. For example, an AP can be a stationary AP providing service to an office building, a school, or a business (e.g., coffee shop, etc.). It is unlikely that a stationary access point will move, or that a location of the stationary access point will change. As an alternative example, an AP can include a nomadic AP 502 (e.g., 502A-E) providing service to a periodically occurring (e.g., yearly, monthly, etc.) convention that changes locations. For instance, at a first time (e.g., September) the AP 502A can be providing service to the convention in a first location 504A (e.g., southwestern united states), at a second time (e.g., October) the AP 502B can be providing service to the convention in a second location 504B (e.g., mid-western united states), and so forth.

Location data for the AP 502 may be collected at the first time (e.g., using the PBIC component 102), when the AP 502A is providing service to the convention in the first location 504A. The location data can be associated with access point (AP) data for the AP 502A (e.g., MAC ID), and maintained in a location database (e.g., location database 106). If the location of a device 506 is determined at a third time based on its proximity to the AP 502C (e.g., using the location database 106), when the AP 502C is providing service to the convention in a third location (e.g., northeastern United States), then the location of the device 506 may be determined incorrectly if the location data associated with the access point 502C is stale (e.g., from the first or second location). As a consequence, location-based services for the device 506 may return persistently bad data and/or results.

In one embodiment, the AP 502 reduces incorrect location determinations associated with nomadic access points by encoding time-to-live information (TTL) into publicly broadcast access point information (e.g., a beacon frame or a probe response). The time-to-live information (TTL) includes a value that indicates a freshness of location information associated with the AP 502. For example, the AP 502 can have a freshness value corresponding to a periodicity of movement of the conventions, and location data for the AP 502 may not be provided to the AP 502 when the location information is not fresh. As an additional or alternative example, the location data associated with the AP 502 can be updated at the third location (e.g., using the update component 406), and the location data associated with the AP 502 (e.g., 502C) may be provided to the device 506 to facilitate location determination based on the proximity of the device 506 to the AP 502C.

Figure 6:
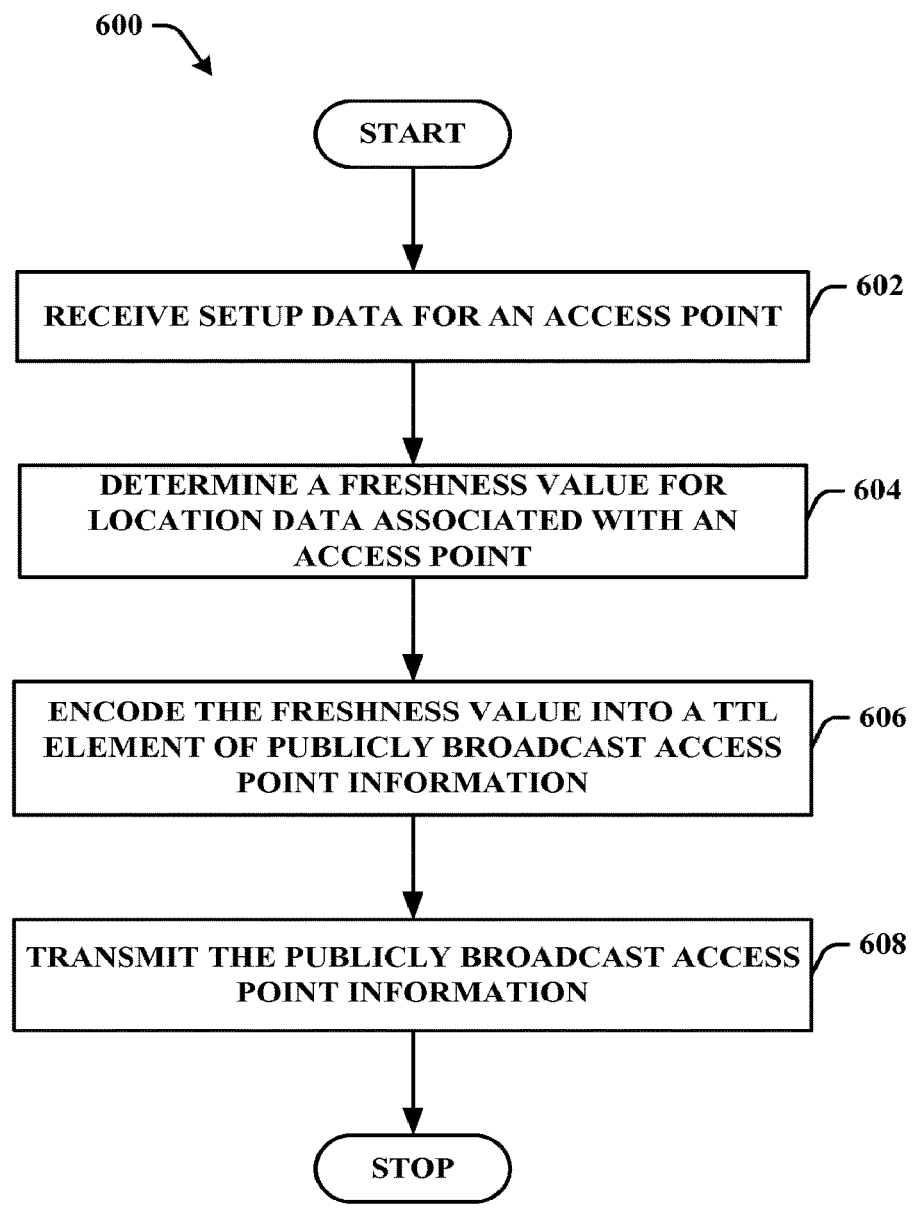
FIGS. 6-8 illustrate examples of methodologies for relating time-to-live information with location data for access points in accordance with various aspects described in this disclosure.
Figure 7:
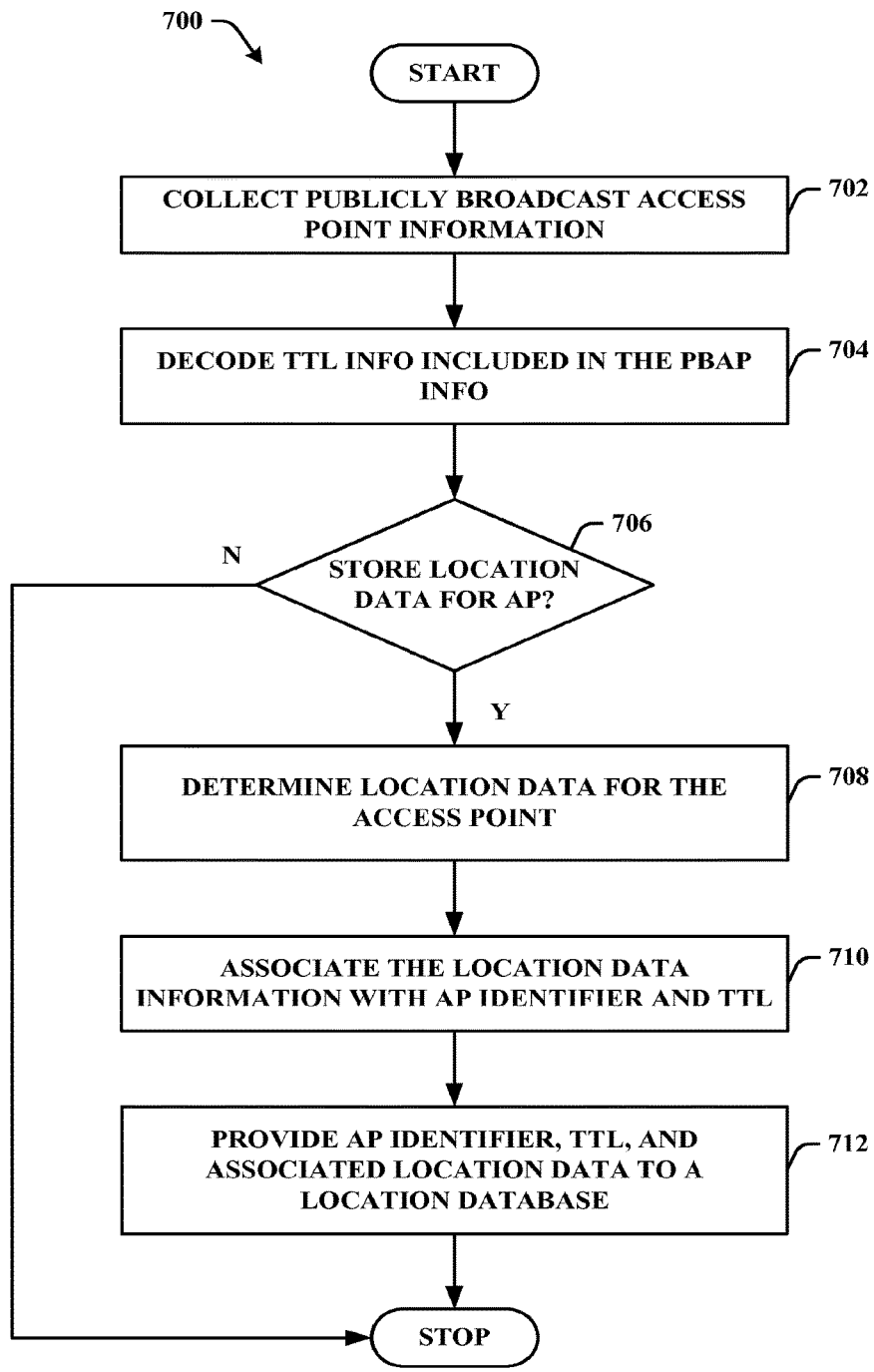
Figure 8:
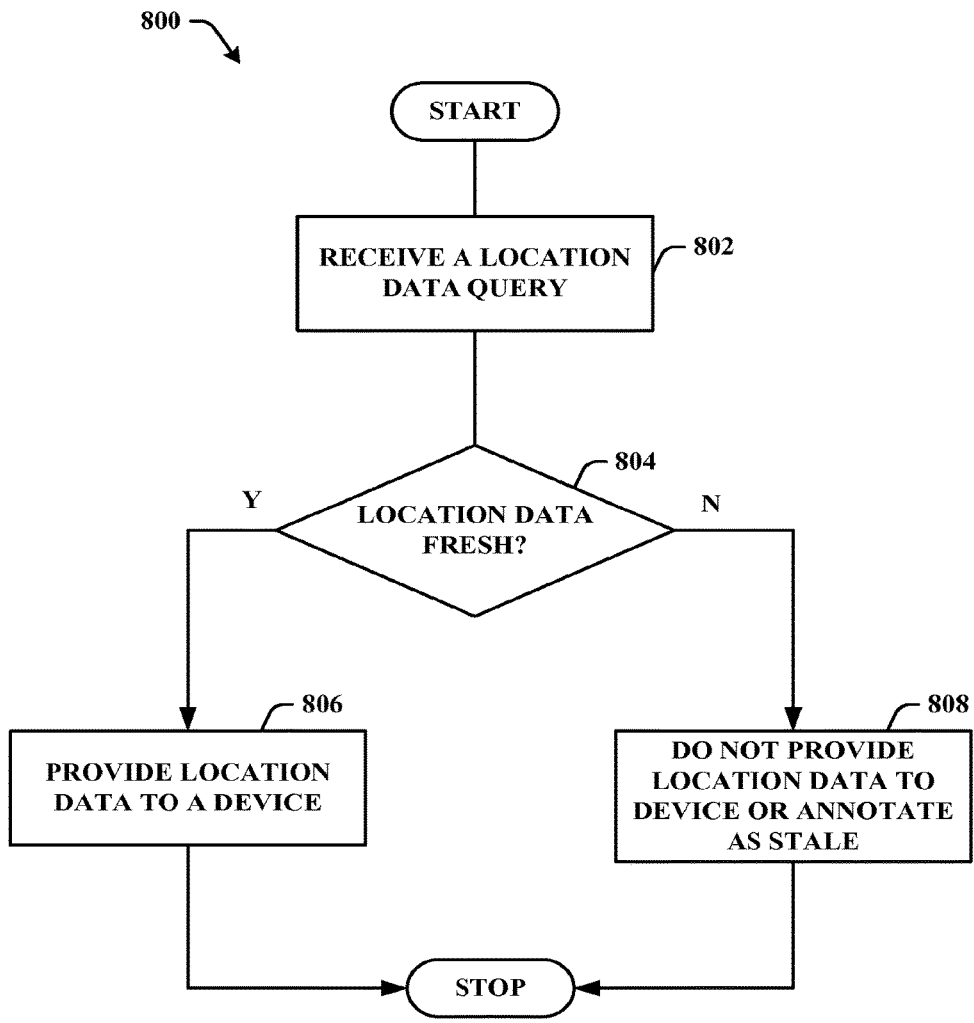

Non-Limiting Examples of Methods for Relating Time-to-Live Information with Location Data for Access Points FIGS. 6-8 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 6, illustrated is an example methodology 600 for relating time-to-live information with location data in accordance with various aspects described in this disclosure. At reference numeral 602, setup data for an access point (AP) is received (e.g., using the input component 208). The setup data can include explicit user inputs (e.g., configuration selections, question/answer, etc.) such as from mouse selections, keyboard selections, and/or speech. Additionally or alternatively, the setup data can also include data uploads, wherein a data upload is a transfer of data from a user or a third party source (e.g. computer or a computer readable medium). For example, in one embodiment, the setup data includes but is not limited to a set of operating parameters for the access point, a media access control identifier (MAC ID), a set of privacy/security options, a freshness value, and/or a set of network communication options.

At reference numeral 604, a freshness value for location data associated with the AP is determined (e.g., using the determination component 210). For example, in one embodiment, a user explicitly sets or provides (e.g., via the setup data) the freshness value for the AP. As an additional or alternative example, in one embodiment, the freshness value is inferred or determined based on a set of freshness factors. The freshness factors include but are not limited to a purpose of the AP, and/or a security policy associated with the AP. For instance, if a security policy associated with the AP indicates that the AP should not be included in a location database (e.g., location database 106), then it can be inferred that the freshness value for the AP should be set to satisfy a non-inclusion threshold.

At reference numeral 606, the freshness value is encoded into a time-to-live information (TTL) element of publicly broadcast access point information (PBAP info or info) for the access point (e.g., using the encoding component 204). The PBAP info for the access point includes but is not limited to a beacon frame and/or a probe response having a set of AP data. The AP data includes but is not limited to a header (e.g., media access control header, etc.), a time stamp, a set of capability data (e.g., network structure data), a service set identifier (SSID), media access control identifier (MAC ID), a set of supported rates data, a frequency-hopping (FH) parameter set, a direct-sequence (DS) parameter set, a contention-free (CF) parameter set, a traffic indication map (TIM), and/or the TTL element.

At reference numeral 608, the PBAP info for the access point is transmitted (e.g., using the transmitter component 206). For example, in one embodiment, the PBAP info is transmitted in response to a probe request from another wireless device (e.g., probe response). As an additional or alternative example, in one implementation, the PBAP info is transmitted based on a set of transmission criteria (e.g., beacon frame). The transmission criteria includes but is not limited to a predetermined time interval (e.g., a target beacon transmission time), and/or at predetermined times.

FIG. 7 illustrates an example methodology 700 for relating time-to-live information with location data in accordance with various aspects described in this disclosure. At reference numeral 702, publicly broadcast access point information (PBAP info) is collected (e.g., using the reception component 302). The PBAP info includes but is not limited to a beacon frame and/or a probe response having an access point (AP) identifier (e.g., MAC ID, SSID, etc.) and TTL. For example, in one embodiment, a probe request is transmitted (e.g., using the probe component 308) to one or more access points, and in response to the probe request, the PBAP info (e.g., probe response) is received (e.g., using the reception component 302). As an additional or alternative example, in one embodiment, the PBAP info is received (e.g., using the reception component 302) without solicitation (e.g., beacon frame) from an AP.

At reference numeral 704, time-to-live information (TTL) for the AP included in the PBAP info is decoded (e.g., using the inspection component 310). The TTL includes a value that indicates a freshness (freshness value) of location data associated with the AP, and/or a desire of an emitter to have location data for the AP collected or stored. At reference numeral 706, a determination is made whether to store location data for the access point based on whether the freshness value satisfies a non-inclusion threshold (e.g., using the association component 304). A freshness value satisfying the non-inclusion threshold indicates a desire of a network operator or emitter not to have data regarding the AP stored. At reference numeral 708, if it is determined that the freshness value does not satisfy the non-inclusion threshold (Y at reference numeral 706), then location data (e.g., GPS coordinates, street address, etc.) for the AP is determined (e.g., using the location component 312). Aspects of the innovation are not limited to techniques for determining the location data associated with an AP. In one embodiment, users are notified of the types of information that are collected, transmitted, and/or stored, and provided the opportunity to opt-out of having such information collected and/or shared.

At reference numeral 710, the location data is associated with the AP identifier and TTL (e.g., using the association component 304). At reference numeral 712, the AP identifier, TTL, and associated location data are provided to a location database (e.g., using the database component 306). Returning to reference numeral 706, if it is determined that the freshness value does satisfy the non-inclusion threshold (N at reference numeral 706), then location data for the AP is not determined and/or stored, and the methodology terminates.

Turning to FIG. 8, illustrated is an example methodology 800 for relating time-to-live information with location data in accordance with various aspects described in this disclosure. At reference numeral 802, a query for location data associated with an AP is received (e.g., using the location database 106) from a device. For example, a social networking application executing on the device can submit a query for location data associated with an AP near the device to provide location-based services for the device.

At reference numeral 804, a determination is made (e.g., using the comparison component 402) whether stored location data associated with the AP (e.g., using the location database 106) is fresh or stable. For example, in one embodiment, a time lapse from an origination of a freshness value is determined, and the time lapse is compared against a period of time indicated in the freshness value to determine whether the location data associated with the AP is potentially fresh. For instance, an access point providing service to a convention (convention AP) may have a relatively short freshness value (e.g., 120 hours) that matches the periodicity of the convention. It can be determined that a time lapse greater than the period of the freshness value for the convention AP has occurred (e.g., two months), and that the location data associated with the convention AP is not fresh.

At reference numeral 806, if it is determined that the location data associated with the AP is fresh (Y at reference numeral 802), then the location data associated with the AP is provided to the querying device (e.g., using the location database 106). Additionally or alternatively, in one embodiment, an approximate location of a device is determined based at least in part on a proximity of the device to the AP (e.g., using the approximation component 404), and the approximate location of the device is provided to the querying device. At reference numeral 808, if it is determined that the location data associated with the AP is not fresh (N at reference numeral 802), then the location data for the AP is not provided to the device, or the location data is provided to the device with an annotation that the location data is not fresh (e.g., using the location database 106). The annotation may include, for example, a single bit marker (e.g., fresh or stale), an amount of time that has passed since the location data was accurate, or a date of terminal validity for the location data. Additionally or alternatively, in one embodiment, an update of the location data for the AP is triggered (e.g., using the update component 406). For example, in one embodiment, a publicly broadcast information collector (e.g., PBIC component 102) is instructed to collect fresh location data for the AP.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 9:
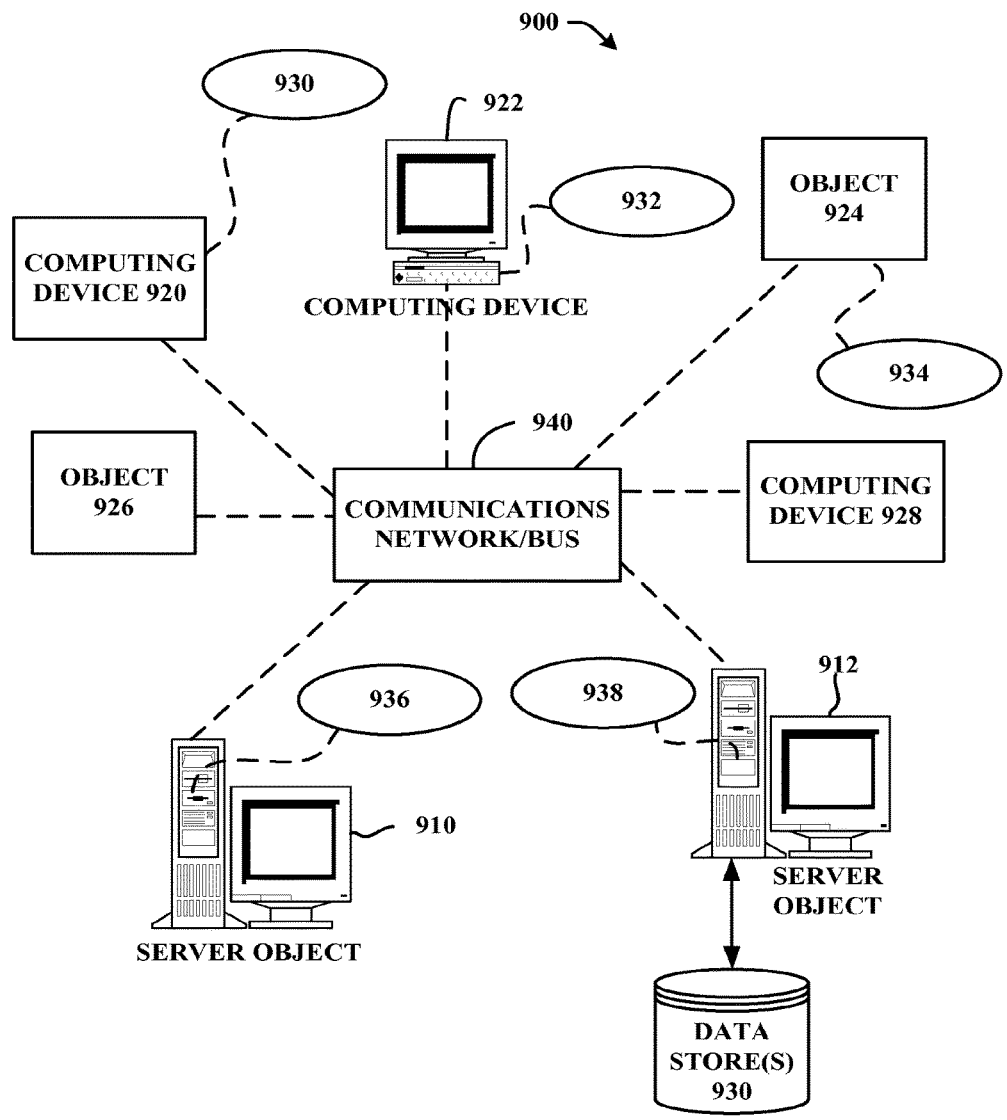
FIG. 9 is a block diagram representing an exemplary non-limiting networked environment in which the various embodiments can be implemented.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects 910, 912, etc. and computing objects or devices 920, 922, 924, 926, 928, etc. may comprise different devices (e.g., PBIC component 102, AP 104, location database 106, and/or device 108), such as an 802.11 access point (e.g., 802.11a, b, g, n and/or ac), a mobile AP (e.g., a MiFi™, etc.), a smart phone, a cell phone, a personal digital assistant (PDA), a tablet, a laptop, a desktop, a portable music player, a video game system, an electronic reader (e-reader), a global positioning system (GPS), a set-top box, and/or a television.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each computing object 910, 912, etc. or computing objects or devices 920, 922, 924, 926, 928, etc. can also contain an application, such as applications 930, 932, 934, 936, 938, that might make use of an API, or other object, software, firmware and/or hardware, suitable for communication with or implementation of relating time-to-live information with location data in accordance with various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc. provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 940 is the Internet, for example, the computing objects 910, 912, etc. can be Web servers with which the client computing objects or devices 920, 922, 924, 926, 928, etc. communicate via any of a number of known protocols, such as the hypertext transfer protocol (HTTP). Objects 910, 912, etc. may also serve as client computing objects or devices 920, 922, 924, 926, 928, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 10 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 10:
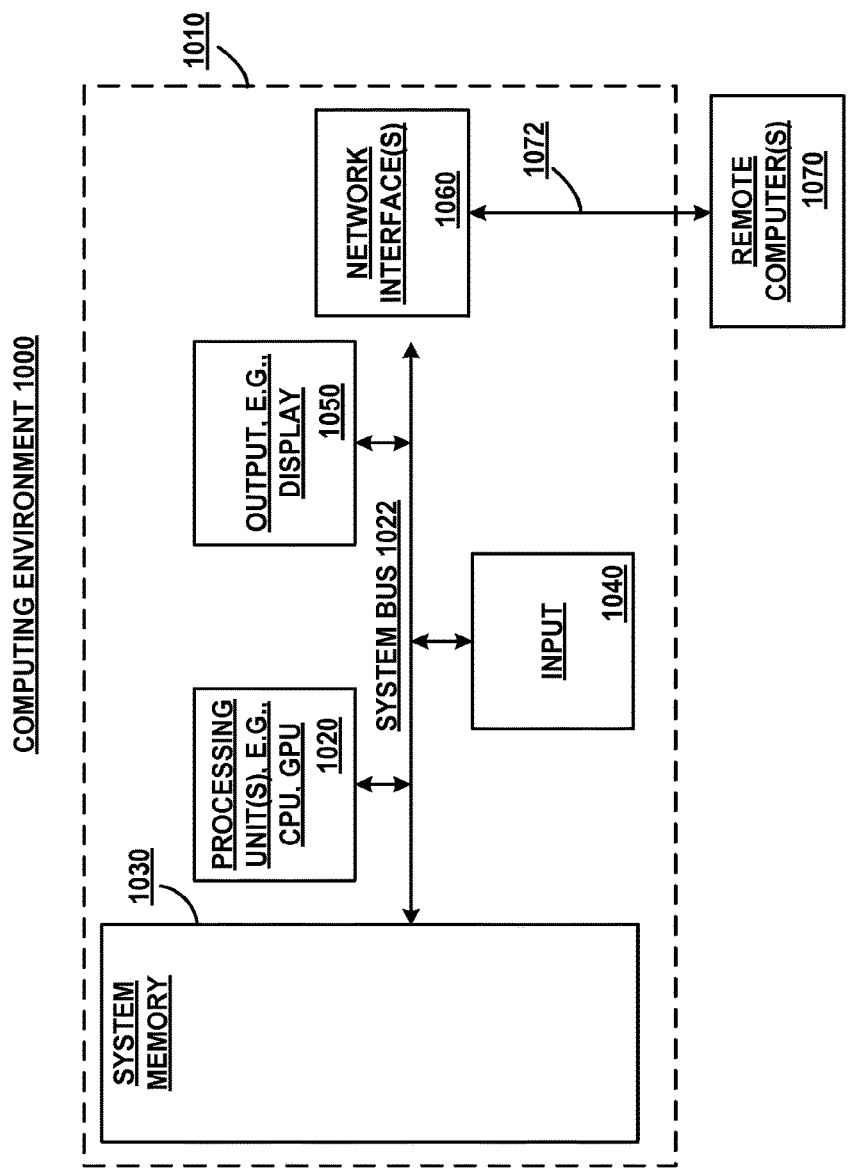
FIG. 10 is a block diagram representing an exemplary non-limiting computing system or operating environment in which the various embodiments may be implemented.

FIG. 10 thus illustrates an example of a suitable computing system environment 1000 in which one or more aspects of the embodiments described herein can be implemented, although as made clear above, the computing system environment 1000 is only one example of a suitable computing environment and is not intended to suggest any limitation as to scope of use or functionality. Neither is the computing environment 1000 be interpreted as having any dependency or requirement relating to any one or combination of components illustrated in the exemplary operating environment 1000. It is to be appreciated that the computer 1010 can be used in connection with implementing one or more of the systems or components shown and described in connection with FIGS. 1-4.

With reference to FIG. 10, an exemplary remote device (e.g., device 108, PBIC component 102, AP 104, etc.) for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user can enter commands and information (e.g., setup data) into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050. The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above (e.g., PBIC component 102, AP 104, location database 106, and/or device 108) relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements. Furthermore, reference throughout this disclosure to "one implementation" or "an implementation" or "one embodiment" or "an embodiment" means that a particular feature, structure, or characteristic described in connection with the implementation or embodiment is included in at least one implementation or embodiment. Thus, the appearances of the phrase "in one implementation" or "in an implementation" or "in one embodiment" or "in an embodiment" in various places throughout this specification are not necessarily all referring to the same implementation or embodiment.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:
1. A method comprising:
 receiving, by a reception component, from an access point, publicly broadcast access point information that includes time-to-live (TTL) information for the access point;

decoding the time-to-live information to identify a freshness value, wherein the freshness value is indicative of a stability period of location data associated with the access point;

determining whether or not to store the location data associated with the access point based on the identified freshness value; and in response to determining to store the location data:

obtaining the location data associated with the access point; and providing, to a data storage system, an association of an identifier for the access point, the time-to-live information, and the obtained location data.

2. The method of claim 1, wherein the freshness value is indicative of a threshold amount of time for which the location data associated with the access point may be used.

3. The method of claim 1, wherein the publicly broadcast access point information includes the identifier for the access point.

4. The method of claim 1, wherein the publicly broadcast access point information includes an unsolicited beacon frame.

5. The method of claim 1, further comprising receiving the publicly broadcast access point information responsive to a probe request transmitted to the access point.

6. The method of claim 1, further comprising determining that the identified freshness value indicates that previously stored location information for the access point has expired.

7. The method of claim 1, further comprising determining whether the location data associated with the access point is to be stored based on a comparison between the freshness value and an inclusion-threshold.

8. The method of claim 7, wherein the comparison indicates that the access point is a nomadic access point.

9. The method of claim 1, comprising obtaining the location data from the access point.

10. The method of claim 1, comprising obtaining the location data from a GPS device.

11. A system, comprising:

one or more processors configured to:

receive, from an access point, publicly broadcast access point information that includes time-to-live information for the access point;

decode the time-to-live information to identify a freshness value, wherein the freshness value is indicative of a stability period of location data associated with the access point;

determine whether or not to store the location data associated with the access point based on the identified freshness value; and in response to the at least one processor determining to store the location data, obtain the location data associated with the access point, and provide, to a data storage system, an association of an identifier for the access point, the time-to-live information, and the obtained location data.

12. The system of claim 11, wherein the freshness value is indicative of a threshold amount of time for which the location data associated with the access point may be used.

13. The system of claim 11, wherein the publicly broadcast access point information includes the identifier for the access point.

14. The system of claim 11, wherein the publicly broadcast access point information includes an unsolicited beacon frame.

15. The system of claim 11, wherein the at least one processor receives the publicly broadcast access point information responsive to a probe request transmitted to the access point.

16. The system of claim 11, wherein the at least one processor is further configured to determine that the identified freshness value indicates that previously stored location information for the access point has expired.

17. The system of claim 11, wherein the at least one processor is configured to determine whether the location data associated with the access point is to be stored based on a comparison between the freshness value and an inclusion-threshold.

18. The system of claim 17, wherein the comparison indicates that the access point is a nomadic access point.

19. The system of claim 11, wherein the at least one processor is configured to obtain the location data from the access point.

20. The system of claim 11, wherein the at least one component is configured to obtain the location data from a GPS receiver in the access point.

* * * * *